Sept. 15, 1936.    O. BECKER    2,054,648
MIXING MACHINE
Filed April 20, 1936    2 Sheets-Sheet 1
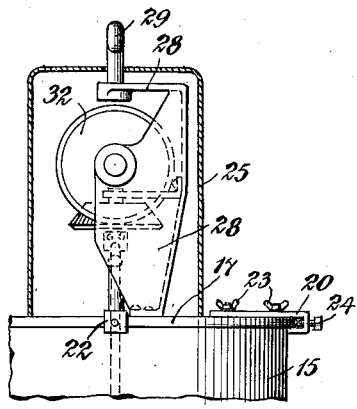
INVENTOR.
OTTO BECKER
BY
ATTORNEY.

Sept. 15, 1936. O. BECKER 2,054,648
MIXING MACHINE
Filed April 20, 1936 2 Sheets-Sheet 2
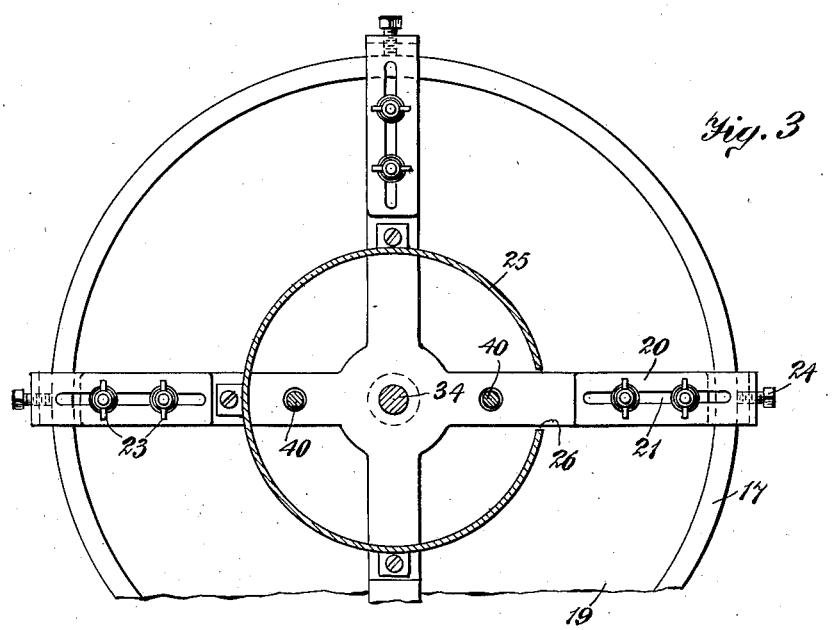
Fig. 3
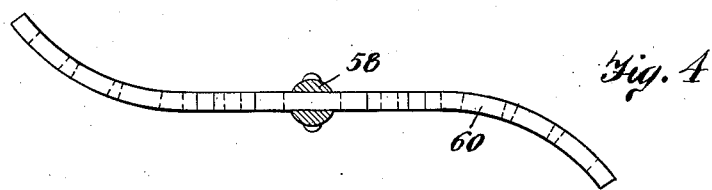
Fig. 4
Fig. 5
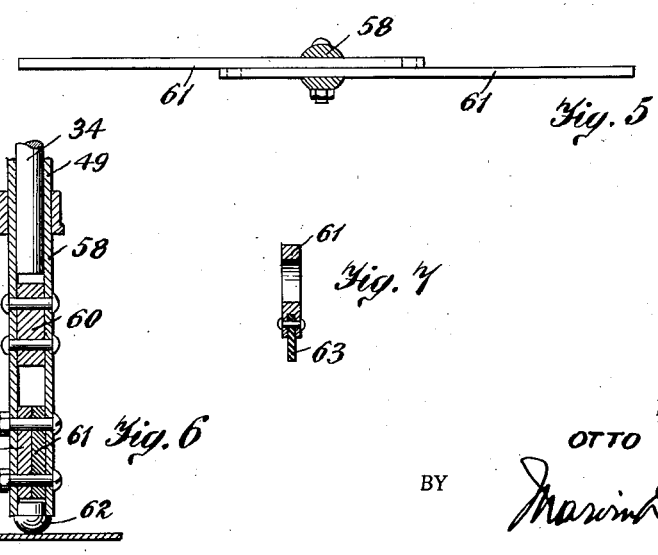
Fig. 6
Fig. 7
INVENTOR.
OTTO BECKER
BY
ATTORNEY.

Patented Sept. 15, 1936

2,054,648

UNITED STATES PATENT OFFICE 2,054,648

MIXING MACHINE

Otto Becker, Corona, N. Y.

Application April 20, 1936, Serial No. 75,388

3 Claims. (Cl. 259—104)

This invention relates to machines for mixing, intermingling and beating fluent bodies, with special reference to paints.

An object of the invention is to provide a mechanism adapted to thoroughly stir a semi-liquid body and incorporate therein additional liquids or pigments to form a homogeneous mass.

A further feature is in the provision of means for preventing splashing or wastage of the contents of the tank in which the mixing is performed.

Another purpose is to produce a mixing machine in which the beaters are adjustable to suit tanks of varying capacity.

These objects are attained by the novel construction and combination of parts hereinafter described and shown in the annexed drawings, forming a material part of this disclosure, and in which:

Figure 1 is a vertical sectional view of an embodiment of the invention as fully assembled.

Figure 2 is a side elevational view, partially in action of the upper portion of the same, drawn to a reduced scale.

Figure 3 is a transverse sectional view taken on line 3—3 of Figure 1.

Figure 4 is a similar sectional view taken on line 4—4 of Figure 1.

Figure 5 is another like sectional view taken on line 5—5 of Figure 1.

Figure 6 is a fragmentary vertical sectional view taken on line 6—6 of Figure 1.

Figure 7 is a cross sectional view taken on line 7—7 of Figure 1.

Referring in greater detail to the drawings, the numeral 15 designates in general the walls of a circular tank 15 having a tight fitting inset bottom 16 and beaded upper edge 17, the tank being provided with handles 18.

A cover plate 19 has fixed on its upper surface a plurality of radial strips 20 containing elongated slots 21, these strips being bent reentrantly at their outer portions to form hooks 22 to engage the bead 17 of the tank, and are adjustable on the cover by clamp bolts 23 passing through the slots, and can be held in adjustment by set screws 24 impinging on the bead.

Mounted centrally on the cover 19 is an inverted, cup-shaped casing 25 having an opening 26 in one side receptive of a bearing 27, supported by a bracket 28 fixed on the cover.

A handle 29 is fixed in the upper part of the bracket 28 to extend centrally through and above the casing 25, and by which the entire device may be moved as a unit.

A short shaft 30 is rotatably mounted in the bearing 27, the shaft having a manually operable crank 31 fixed on its outer end and a bevel gear 32 is secured on its inner end.

Meshed with the gear 32 is a pinion 33 fixed in a spindle 34 arranged axially with reference to the tank and casing, the spindle being guided by an angular bracket 35, secured to the main bracket 28, at its upper extremity and further guided in a bearing 36 formed on the cover 19.

Below the bearing 36 is a bevel gear 38 arranged to drive opposed pinions 39 fixed on diagonally disposed shafts 40 below the cover 19.

The upper ends of the shafts 40 are held by ball joints 41 to angular supports 42 fixed to the main brackets 28 and pass through appropriate openings in the cover.

The lower portions of the shafts 40 enter telescopically into sleeves 44 which are held adjustably by set screws 45; the bottoms of the sleeves are pivoted at 46 to supports 47 fixed on the periphery of a cross bar 48 provided with an elongated collar 49 slidable on the spindle 34 and to which it may be adjustably secured by a set screw 50.

A skeleton frame composed of adjustable side members 52, pivoted at their ends, as at 53 to bottom members 54, adjacent the pivots 46, and at their upper ends to yokes 55 secured to the pinions 39, the sides being held in adjusted relation by bolts 56.

These frame members are perforated and obviously, together with the shafts and sleeves, are arranged to permit raising and lowering of the bar 48 to suit conditions.

Below the plate is a stud 58 fixed to the spindle 34, and to which is riveted a pair of opposed curved plate beaters 60, while further below, are bolted a pair of scraper plates 61, all these several members being perforated and freely revolvable within the tank 15.

A thrust or foot bearing 62 preferably of rubber, at the end of the stud, rests on the bottom 16 of the tank.

Set in the lower edge of the scraper are strips of rubber 63 adapted to contact the bottom of the tank, while it will be seen that the scraper elements are relatively adjustable to the interior of the tank.

From the foregoing, it will be seen that a device has been described capable of stirring and intimately mixing the contents of a tank by manual operation of a crank handle.

Also that the device is adjustable to suit the quantity of contents held in the tank and that waste cannot occur.

Having thus described the invention what is claimed as new and sought to secure by Letters Patent, is:

1. A mixing machine comprising a circular tank having a beaded rim, a cover clamped thereover, a bracket on said cover, an axial spindle revoluble in said bracket and cover, said spindle extending into the tank, manual means for rotating said spindle, a casing over said means, a bevel gear on said spindle below said cover, a pair of obliquely disposed telescopic shafts adjustably mounted in said tank, said shafts having pinions meshed with said gear, adjustable bearings for the lower ends of said shafts, a pair of curved beaters on said spindle below said bearings, opposed radial scrapers on the bottom of said spindle, and elastic wipers fixed in the lower edges of said scrapers to contact the bottom of said tank.

2. A mixing machine comprising a tank having a removably clamped cover, an axial spindle revoluble in said tank, a cross bar adjustable as to height on said spindle in the tank, a bracket on said cover, adjustable bearings on said bracket and cross bar, oblique shafts formed in telescopic sections journalled in opposed relation in said bearings, driving connections between said spindle and shafts, means for actuating said spindle, opposed perforated beater arms on said shafts, means to adjust the length of said arms and shafts, an adjustable scraper blade on said spindle below said bar, and rubber wipers carried on the lower edges of said blade.

3. A mixing machine comprising a tank having a removably clamped cover, an axial spindle revoluble in said tank, a cross bar adjustable as to heigth on said spindle in the tank, a bracket on said cover, adjustable bearings on said bracket and cross bar, a carrying handle on said bracket, a casing on said cover, manual means for rotating said spindle housed in said casing, oblique shafts formed in telescopic sections journalled in opposed relation in said bearings, driving connections between said spindle and shafts, opposed perforated beater arms on said shafts, means to adjust the length of said arms and shafts, an adjustable scraper blade on said spindle below said bar, and rubber wipers carried on the lower edges of said blade.

OTTO BECKER.